(12) United States Patent
Llatser Marti et al.

(10) Patent No.: US 12,444,297 B2
(45) Date of Patent: Oct. 14, 2025

(54) METHOD FOR PROVIDING AN OBJECT MESSAGE ABOUT AN OBJECT, WHICH IS RECOGNIZED IN THE SURROUNDINGS OF A ROAD USER, IN A COMMUNICATION NETWORK FOR THE COMMUNICATION WITH OTHER ROAD USERS

(71) Applicant: Robert Bosch GmbH, Stuttgart (DE)

(72) Inventors: Ignacio Llatser Marti, Hildesheim (DE); Florian Alexander Schiegg, Hildesheim (DE); Frank Hofmann, Hildesheim (DE); Maxim Dolgov, Renningen (DE); Florian Wildschuette, Hildesheim (DE); Hendrik Fuchs, Hildesheim (DE); Thomas Michalke, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 218 days.

(21) Appl. No.: 17/767,753

(22) PCT Filed: Sep. 22, 2020

(86) PCT No.: PCT/EP2020/076407
§ 371 (c)(1),
(2) Date: Apr. 8, 2022

(87) PCT Pub. No.: WO2021/073839
PCT Pub. Date: Apr. 22, 2021

(65) Prior Publication Data
US 2024/0087445 A1    Mar. 14, 2024

(30) Foreign Application Priority Data
Oct. 18, 2019   (DE) ............... 10 2019 216 074.3

(51) Int. Cl.
*G08G 1/01*   (2006.01)
*G06V 20/58*   (2022.01)
(Continued)

(52) U.S. Cl.
CPC ........... *G08G 1/0104* (2013.01); *G06V 20/58* (2022.01); *G08G 1/16* (2013.01); *H04W 4/40* (2018.02)

(58) Field of Classification Search
None
See application file for complete search history.

(56) References Cited

U.S. PATENT DOCUMENTS

2015/0085124 A1* 3/2015 Poppe ............... A61B 5/18 348/148
2018/0082493 A1* 3/2018 Patil ............... H04W 72/02
(Continued)

FOREIGN PATENT DOCUMENTS

CN    108921418 A    11/2018
CN    109532827 A    3/2019
(Continued)

OTHER PUBLICATIONS

International Search Report for PCT/EP2020/076407, Issued Nov. 17, 2020.
(Continued)

*Primary Examiner* — Jelani A Smith
*Assistant Examiner* — Davin Seol
(74) *Attorney, Agent, or Firm* — NORTON ROSE FULBRIGHT US LLP

(57) ABSTRACT

A method for providing an object message about an object, recognized in surroundings of a road user, in a communication network for communicating with other road users. The road user includes a sensor system for detecting the surroundings and an evaluation unit for evaluating sensor
(Continued)

Figure 1:
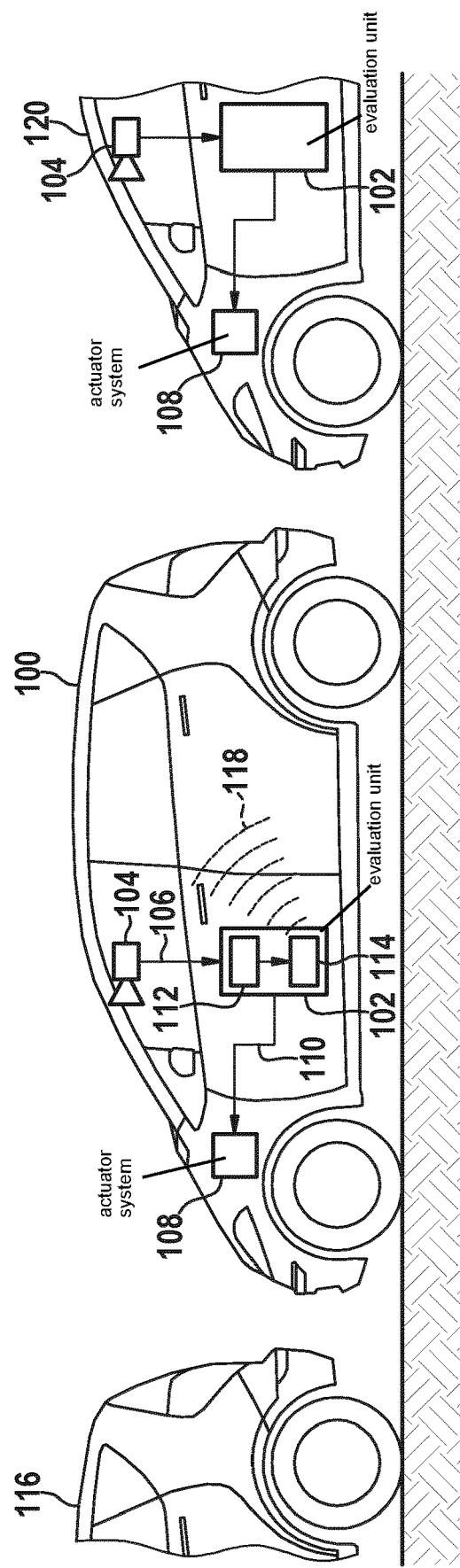

data generated by the sensor system and transferring object messages via the communication network. The method includes: receiving sensor data, generated by the sensor system, in the evaluation unit; recognizing at least one object in the surroundings of the road user based on the sensor data, a movement parameter and a further object parameter being ascertained; calculating an object transfer priority; determining, based on the object transfer priority, whether the recognized object is to be included in an object message; and, if so, generating the object message including the recognized object, and sending the object message via the wireless communication network.

15 Claims, 2 Drawing Sheets

(51) Int. Cl.
*G08G 1/16* (2006.01)
*H04W 4/40* (2018.01)

(56) References Cited

U.S. PATENT DOCUMENTS

| | | | | |
|---|---|---|---|---|
| 2019/0064815 | A1* | 2/2019 | Haynes | G08G 1/0112 |
| 2019/0147260 | A1* | 5/2019 | May | B60W 50/14 |
| | | | | 382/103 |
| 2020/0126421 | A1* | 4/2020 | Zhang | H04W 4/44 |
| 2020/0288431 | A1* | 9/2020 | Lee | H04W 56/0015 |
| 2021/0056852 | A1* | 2/2021 | Lund | G08G 1/005 |
| 2021/0300402 | A1* | 9/2021 | Wendland | H04W 4/40 |
| 2022/0005353 | A1* | 1/2022 | Hwang | H04W 4/40 |

FOREIGN PATENT DOCUMENTS

| | | | | |
|---|---|---|---|---|
| CN | 109922439 A | | 6/2019 | |
| DE | 102014008746 A1 | * | 12/2015 | G08G 1/09 |
| EP | 3678438 A1 | | 7/2020 | |
| JP | 2018142921 A1 | | 9/2018 | |
| JP | 2019109795 A | | 7/2019 | |
| KR | 20190116187 A | | 10/2019 | |
| WO | 2019074348 A1 | | 4/2019 | |

OTHER PUBLICATIONS

ETSI TR 103 562 V2.1.1, "Intelligent Transport Systems (ITS); Vehicular Communications; Basic Set of Applications; Analysis of the Collective Perception Service (CPS)," (Dec. 2019), 2019, pp. 1-119.

* cited by examiner

METHOD FOR PROVIDING AN OBJECT MESSAGE ABOUT AN OBJECT, WHICH IS RECOGNIZED IN THE SURROUNDINGS OF A ROAD USER, IN A COMMUNICATION NETWORK FOR THE COMMUNICATION WITH OTHER ROAD USERS

FIELD

The present invention relates to a method, to an evaluation unit, to a computer program, and to a computer-readable medium for providing an object message about an object recognized in surroundings of a road user in a communication network for the communication with other road users.

BACKGROUND INFORMATION

An increasing automation of vehicles is accompanied by an increasing need for highly reliable surroundings models for surroundings of vehicles driving in an automated manner. To be able to assist a driver or make independent decisions, it is necessary for vehicles to perceive their surroundings and recognize potential hazards and hazards as precisely as possible. For this purpose, data which are detected by vehicle-side sensors, such as, for example, video cameras, radar or LIDAR sensors, may be aggregated and incorporated into the surroundings model of the road user.

In this connection, interest is also growing in the vehicle-to-infrastructure (V2I) communication and the vehicle-to-vehicle communication (V2V), collectively also referred to as vehicle-to-X (V2X) communication. V2X communication makes it possible to improve a surroundings model by supplementation with data from incoming V2X messages.

The collective perception is based on messages about the instantaneous surroundings of the road user being sent to other connected stations, such as other vehicles, pedestrians or infrastructure elements, via V2X communication, or being received from the connected stations, as is described, for example, in ETSI TR 103 562, Intelligent Transport System (ITS); Vehicular Communications; Basic Set of Applications; Analysis of the Collective Perception Service (CPS). These messages, also referred to as Collective Perception Messages (CPM), may contain, for example, data regarding recognized objects, such as other road users, obstacles, roadway markings, points of reference, traffic lights or free areas, in abstract descriptions. A typical scenario is, for example, expressway on-ramps, where messages about recognized objects are exchanged between entering vehicles and vehicles driving on the expressway.

Such messages may, for example, encompass pieces of information about an ego-vehicle and its sensors as well as a list of recognized objects. The collective perception may reduce the surroundings uncertainty of involved stations with respect to their respective instantaneous surroundings in that a comparatively higher number of objects may be perceived, and also the quality of the perceived object data may be improved.

The Intelligent Transport Systems committee of the European Telecommunications Standards Institute (ETSI) is currently proposing a service for collective perception for standardization in the EU. The proposal relates primarily to the content of the exchanged messages and the frequency with which the messages are to be generated.

SUMMARY

Against this background, the approach presented here provides a method, an evaluation unit, a computer program, and a computer-readable medium for providing an object message about an object recognized in surroundings of a road user in a communication network for the communication with other road users. Advantageous refinements and improvements of the approach presented here may be derived from the disclosure herein.

Specific embodiments of the present invention advantageously make it possible to select those objects which are particularly relevant for a road user, as well as for other road users, from a number of objects which are detected and recognized in the surroundings of the road user with the aid of sensors. The relevance may be calculated based on multiple criteria. In particular, the relevance may be calculated in that various properties of the recognized objects are assigned various priority values, and that an overall priority is calculated from these priority values. Based on the overall priority assigned to a recognized object, it is now possible to determine whether a message with respect to the particular object is to be generated and sent to other road users, or, if the message contains a list of recognized objects, whether the recognized object is to be included in the list of recognized objects. For this purpose, the overall priority may be compared to a predefined threshold value, for example. This has the advantage that only a single threshold value comparison must be carried out for each recognized object, to decide whether or not an object message is to be generated instead of, as has been customary thus far, carrying out a dedicated threshold value comparison for each of the detected properties of the object.

A first aspect of the present invention relates to methods for providing an object message about an object recognized in surroundings of a road user in a communication network for the communication with other road users. The road user includes a sensor system for detecting the surroundings and an evaluation unit for evaluating sensor data generated by the sensor system. Furthermore, the evaluation unit is configured to transfer, i.e., to send and/or to receive, object messages via the communication network. In accordance with an example embodiment of the present invention, the method includes the following steps, preferably in the indicated order: receiving sensor data, generated by the sensor system, in the evaluation unit; recognizing at least one object in the surroundings of the road user based on the sensor data, at least one movement parameter describing a movement of the object and/or at least one object parameter describing a further property of the object being ascertained; calculating an object transfer priority from the movement parameter and/or the further object parameter, the object transfer priority representing a relevance of the recognized object for the road user and/or other road users; determining, based on the object transfer priority, whether the recognized object is to be included in an object message; and, if so, generating the object message including the recognized object, and sending the object message via the wireless communication network.

The sensor system may, for example, encompass a camera, a radar sensor or a LIDAR sensor. The evaluation unit may, for example, be a component of an on-board computer of the road user, for example of a vehicle. Furthermore, the evaluation unit may be designed to control, for example to steer, to decelerate and/or to accelerate, the road user. The road user may include an actuator system, which is activatable by the evaluation unit. The actuator system may, for example, encompass a steering or brake actuator or an engine control unit. The evaluation unit may also be designed to control the road user based on object messages provided by other road users and received via the communication network.

A road user may, for example, be understood to mean a motor vehicle, such as a passenger car, a truck, a bus or a motorcycle, an element of a traffic infrastructure, also referred to as roadside unit, a bicycle, a kick scooter, or a pedestrian.

A communication network may be understood to mean a network for traffic linking, for example from vehicle to vehicle (V2V or Car2Car), from vehicle to road (V2R), from vehicle to infrastructure (V2I), from vehicle to network (V2N) or from vehicle to persons (V2P). For example, the object messages may be transferred via a wireless communication link, such as, for example, a WLAN, Bluetooth or mobile communication link, between users of the communication network.

In addition to a header, an object message may, for example, include a list of recognized objects, information about the road user, for example about the steering angle, position, direction or velocity of the road user, and information about the sensor system of the road user, for example about a field of vision or a range of the sensor system. The recognized objects may, among other things, be described by a position, a location, a velocity, a size or an object class, for example.

The movement parameter may, for example, describe a position, a location, a velocity, an acceleration or a presumable trajectory of the object in a vehicle coordinate system fixedly connected to the road user and/or an external coordinate system including geographical coordinates.

A further object parameter may, in general, be understood to mean a parameter which is ascertained independently of the at least one movement parameter of the object. What may specifically be understood as an object parameter is explained in greater detail based on the following specific embodiments.

An object transfer priority may be understood to mean a calculated overall priority value. In the process, exactly one object transfer priority may be assigned to each recognized object. The object transfer priority may be calculated from at least one parameter with respect to at least one property of the recognized object, for example by addition and/or multiplication of the movement parameter to/with at least one further object parameter. As an alternative, it is possible that, based on the movement parameter, a priority value which is assigned to the movement parameter is calculated and that, based on the further object parameter, a priority value which is assigned to the further object parameter is calculated, and the object transfer priority is then calculated from the priority values. In other words, the movement parameter or further object parameter may initially be converted in a suitable manner into a corresponding priority value before the calculation of the object transfer priority from the priority values takes place. During the conversion into the priority value, the movement parameter or further object parameter may be weighted corresponding to its importance or relevance for the road user. In this way, differing parameters may be rendered comparable to one another. To decide whether or not the recognized object is to be the subject matter of an object message, i.e., for example, is to be included in the list of recognized objects of the object message or not, the object transfer priority may, for example, be compared to a stored threshold value. In the process, the object message including the recognized object may be generated when the object transfer priority exceeds the threshold value. Conversely, the object message may not be generated or be generated without the recognized object when the object transfer priority is below the threshold value.

A second aspect of the present invention relates to an evaluation unit which is designed to carry out the method as described above and below. Features of the method, as described above and below, may also be features of the evaluation unit.

Further aspects of the present invention relate to a computer program which, when executed on a processor, carries out the method as described above and below, as well as to a computer-readable medium on which such a computer program is stored.

The computer-readable medium may, for example, be a hard drive, a USB memory device, a RAM, a ROM, an EPROM or a flash memory. The computer-readable medium may also be a data communication network enabling a download of program code, such as for example the Internet. The computer-readable medium may be transitory or non-transitory.

Features of the method, as described above and below, may also be features of the computer program and/or of the computer-readable medium.

Ideas regarding specific embodiments of the present invention may, among other things, be considered to be based on the concepts and findings described hereafter.

The exchange of above-explained object messages between connected stations of the communication network may offer a crucial advantage for automated driving functions in that the surroundings model of the road user may be improved. In general, not all recognized objects are equally relevant for the surroundings model. For example, an object situated on a road which may represent a potential hazard for multiple vehicles may represent a higher functional benefit for the road user than an object situated on a sidewalk. On the other hand, the periodic transfer of such object messages may result in a channel overload, and thus in a reduced performance of the communication network. With respect to the objects to be transferred and the transfer frequency (one and the same object may also be sent multiple times, for example, when it is recognized more than once by the on-board sensors), a compromise should thus be found between the functional benefit of the objects and the network utilization.

It may be important to devise suitable rules for the message generation, with the aid of which a good compromise may be achieved between the two criteria. The generation rules described here are based on the assignment of priorities to the recognized objects. The priority of a recognized object is calculated in accordance with the estimated functional benefit of the recognized object for the road user or other road users.

Present generation rules are primarily based on dynamic properties of the recognized objects, i.e., on changes in their position and velocity. Other, also important criteria are considered to a lesser degree therein.

The approach described here, in contrast, enables a differentiated estimation of the functional benefit of the recognized objects based on corresponding generation rules.

According to one specific embodiment of the present invention, the movement parameter and the further object parameter may be added to and/or multiplied with one another to calculate the object transfer priority. In addition or as an alternative, at least one of the two parameters may be weighted, and the object transfer priority may be calculated from the weighted parameter. The weighting may take place, for example, by multiplication or potentiation of the particular parameter using a suitable weighting factor. The weighting factors may be predefined, for example, and be stored in the evaluation unit. In this way, differing parameters may be rendered comparable to one another with little complexity.

According to one specific embodiment of the present invention, the movement parameter may indicate whether the recognized object is moving longitudinally and/or transversely to a driving direction of the road user. In the process, the movement parameter may be weighted higher when the recognized object is moving transversely to the driving direction. In addition or as an alternative, the movement parameter may be weighted lower when the recognized object is moving longitudinally to the driving direction. In this way, the object transfer priority may be calculated with higher accuracy.

According to one specific embodiment of the present invention, the method furthermore includes: inserting the recognized object into a surroundings model representing the surroundings of the road user, the surroundings model storing the movement parameter and/or the further object parameter. In the process, the stored movement parameter and/or the stored further object parameter may be updated based on the sensor data in consecutive time steps. Furthermore, a change in the stored movement parameter and/or a change in the stored further object parameter between at least two time steps may be ascertained. Furthermore, the object transfer priority may be calculated from the change in the stored movement parameter and/or the change in the stored further object parameter.

In other words, it is possible to ascertain to what extent the movement parameter or the further object parameter changes as a result of an update of the surroundings model with sensor data from an instantaneous measurement. Depending on the degree of the change, a higher or lower priority of the recognized object may be inferred. For example, the greater the change, the higher the priority may be.

A surroundings model may be understood to mean a modeled, in particular, three-dimensional representation of the surroundings of the road user. In other words, the surroundings model may be a dynamic data structure, in which relevant objects, such as, for example, other vehicles or infrastructure elements, may be represented in a shared reference system with the road user in location and time.

For example, the road user's proper motion may be ascertained by a proper motion model, in the simplest case, for example, a kinematic, linear single-track model, or based on a driver intent recognition.

For example, the surroundings model may model, among other things, a traffic space of the road user, for example with the aid of a road marking recognition, a recognition of freely negotiable areas, a localization of the road user relative to a traffic lane or in a digital map, or with the aid of a recognition of traffic signs or traffic signaling systems.

The sensor system may, for example, continuously detect and chronologically track objects in the surroundings of the road user, also referred to as tracking. In the process, states of the objects, for example their positions, locations or velocities, may be estimated. The sensor data may encompass fused data of one or multiple sensor unit(s) of the sensor system. In addition, pieces of information from a digital map or vehicle-external pieces of information, received via the communication network, may be utilized for recognizing objects with the aid of the surroundings model.

During the recognition of the objects, the objects may be detected and/or classified, also referred to as object discrimination. In the case of a detection, it is decided whether an object is present. In the case of a classification, an object is assigned to a predefined object class, for example a "vehicle," "tree," "building" or "person" object class.

A recognized object may, for example, be stored as a point model or expanded two-dimensional or three-dimensional model, including information about the position, location, velocity, acceleration, yaw angle or yaw rate relative to the road user, in the surroundings model. These pieces of information may be continuously estimated, i.e., updated, in multiple consecutive time steps based on the sensor data of the sensor system.

According to one specific embodiment of the present invention, a measuring certainty with respect to the recognized object may be ascertained. In the process, the object transfer priority may be calculated from the measuring certainty. A measuring certainty may, in general, be understood to mean a measure of an accuracy or trustworthiness of an object recognition. In other words, the measuring certainty may indicate whether or to what degree the recognized object agrees with an actually present object. For example, the measuring certainty may be described by a value of an existence or state probability, a covariance or another probability degree with respect to a detection and/or classification of an object based on the sensor data.

According to one specific embodiment of the present invention, at least one further object in the surroundings of the road user may be recognized based on the sensor data. In the process, time periods until a potential collision (time to collision, also referred to as TTC in short), of the recognized object with the recognized further object and/or the road user may be ascertained. Furthermore, the shortest time period may be selected from the ascertained time periods. The object transfer priority may then be calculated from this selected shortest time period. For example, the shorter the selected shortest time period, the greater the object transfer priority may be.

According to one specific embodiment of the present invention, a degree of concealment may be ascertained, which indicates a concealment of at least one further object in the surroundings of the road user by the recognized object. The object transfer priority may be calculated from the degree of concealment in the process. The degree of concealment may, for example, be described by a value of a surface area concealed by the recognized object.

According to one specific embodiment of the present invention, the object may be assigned to at least one object class. Each object class may be assigned a priority value. The object transfer priority may be calculated from the priority value of the object class assigned to the object. Different object classes may be relevant to differing degrees for the road user. Accordingly, different object classes may differ from one another in the priority values assigned thereto. An object class may be understood to mean a predefined object category or object type. The assignment of the object to at least one object class, also referred to as classification, may be carried out with the aid of a machine learning algorithm, for example. The object may also be assigned to multiple object classes. In this case, the individual priority values of the object classes assigned to the object may be combined into an individual value. The individual value may then be used for calculating the object transfer priority.

According to one specific embodiment of the present invention, a transfer time period since the last time an earlier object message about the recognized object was sent and/or received via the communication network may be ascertained. In the process, the object transfer priority may be calculated from the transfer time period. Similarly to the road user, it is also possible for other, neighboring road users to be configured to send object messages about objects in the surroundings of the road user via the communication network. The evaluation unit of the road user may receive these object messages, for example, and process them in a suitable manner to update its own surroundings model. Based on the transfer time period, it is possible to draw conclusions on the up-to-dateness of the recognized object. For example, the longer the transfer time period, the greater the object transfer priority may be.

BRIEF DESCRIPTION OF EXAMPLE EMBODIMENTS

Specific embodiments of the present invention are described hereafter with reference to the figures; neither the figures nor the description should be interpreted as limiting the present invention.

FIG. 1 schematically shows a vehicle including an evaluation unit according to one exemplary embodiment of the present invention.

Figure 2:
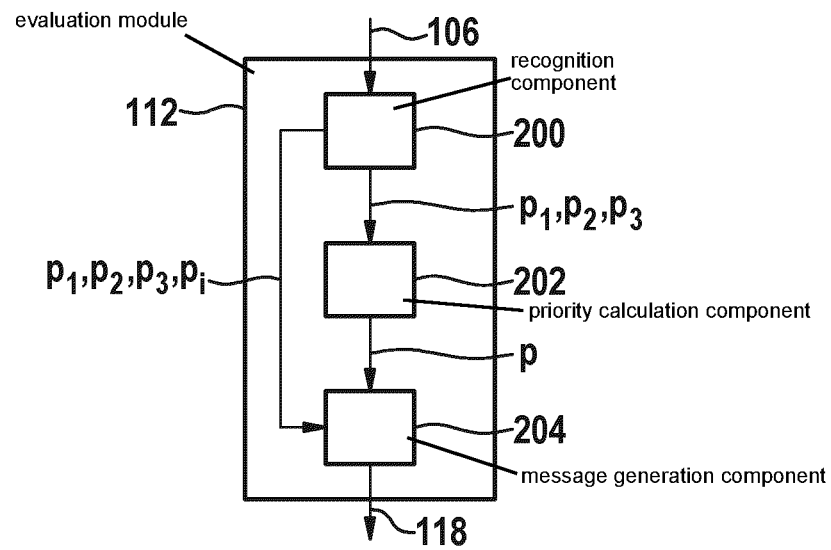

FIG. 2 schematically shows an evaluation module of an evaluation unit from FIG. 1.

Figure 3:
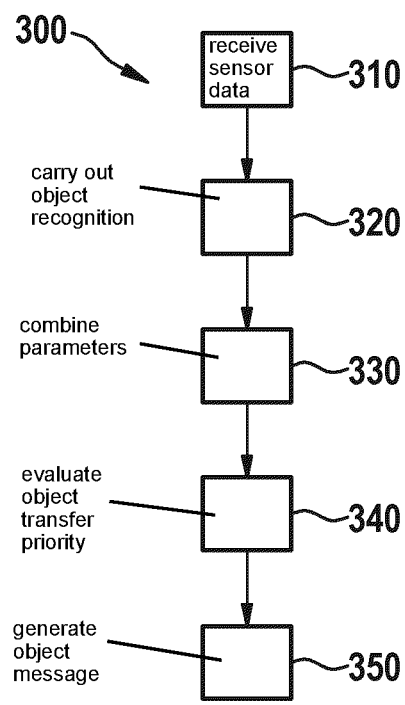

FIG. 3 shows a flowchart of a method according to one exemplary embodiment of the present invention.

The figures are only schematic representations and are not true to scale. Identical reference numerals denote identical or equally acting features in the figures.

DETAILED DESCRIPTION OF EXAMPLE EMBODIMENTS

FIG. 1 shows a vehicle 100 including an evaluation unit 102, which is connected to a sensor system 104 of vehicle 100 to process sensor data 106 generated by sensor system 104. Sensor system 104 is designed to monitor surroundings of vehicle 100. Sensor system 104 is implemented as a camera here by way of example. However, sensor system 104 may also include multiple, different sensor units. In this way, sensor system 104, in addition or as an alternative to a camera, may, for example, include at least one radar sensor, LIDAR sensor or ultrasonic sensor.

Furthermore, evaluation unit 102 is connected to an actuator system 108 of vehicle 100. Actuator system 108 may, for example, encompass a steering or brake actuator or an actuator for engine control. Evaluation unit 102 may be designed to generate, based on sensor data 106, a control signal 110 for activating actuator system 108 in order to control, i.e., to steer, to decelerate, to accelerate, vehicle 100 in an automated manner or to navigate it according to a predefined route in a digital map. In addition or as an alternative, evaluation unit 102 may be designed to generate a signal for driver information based on sensor data 106.

Evaluation unit 102 includes an evaluation module 112 and a communication module 114 which is connected to the evaluation module and configured to transfer data via a communication network. The communication network links vehicle 100 to further road users, for example via a wireless communication link. Modules 112, 114 may be implemented as hardware and/or software.

Evaluation module 112 is configured to receive sensor data 106 from sensor system 104, and to process and evaluate these data for recognizing objects in the surroundings of vehicle 100. In this example, evaluation module 112, based on sensor data 106, recognizes a further vehicle 116, which precedes vehicle 100. For example, evaluation module 112 recognizes a position, a velocity, and an object class of further vehicle 116. Furthermore, based on the position, the velocity, and the object class of further vehicle 116, evaluation module 112 calculates an object transfer priority, which indicates how relevant further vehicle 116 is for vehicle 100 or also for an entire driving surroundings. Depending on the calculated object transfer priority, evaluation module 112 decides whether an object message 118, which includes pieces of information about further vehicle 116, here its position, velocity and object class, is to be provided in the communication network. In this example, evaluation module 112 establishes a sufficiently high object transfer priority, and accordingly generates object message 118 with respect to further vehicle 116. Communication module 114 sends object message 118 via the communication network. Object message 118 may, for example, be received by a third vehicle 120, which may be configured similarly to vehicle 100, to communicate via the communication network with other road users.

FIG. 2 schematically shows a possible configuration of evaluation module 112 from FIG. 1. Evaluation module 112, which may be interpreted as an implementation of a surroundings model of vehicle 100 as hardware and/or software, includes a recognition component 200, which receives sensor data 106 and determines, for example, a velocity and an acceleration of further vehicle 116 from sensor data 106. Furthermore, recognition component 200 determines an object class of further vehicle 116, which is assigned the "vehicle" object class here, for example. Accordingly, recognition component 200 issues three parameters $p_1$, $p_2$, $p_3$, first parameter $p_1$ describing a value of the velocity of further vehicle 116, second parameter $p_2$ describing a value of the acceleration of further vehicle 116, and third parameter $p_3$ describing a priority value determined as a function of the recognized object class of further vehicle 116.

Parameters $p_1$, $p_2$, $p_3$ are incorporated into a priority calculation component 202, which calculates object transfer priority p from parameters $p_1$, $p_2$, $p_3$. For this purpose, parameters $p_1$, $p_2$, $p_3$ may be weighted, for example, as is described in greater detail hereafter.

A message generation component 204 is configured to determine, based on object transfer priority p, whether an object message with respect to further vehicle 116 is to be sent. For this purpose, message generation component 204 compares object transfer priority p to a stored threshold value, for example. In this example, object transfer priority p is greater than the threshold value. Accordingly, message generation component 204 generates object message 118 including pieces of information regarding the recognized further vehicle 116. Object message 118 may encompass parameters $p_1$, $p_2$, $p_3$, for example. In addition, object message 118 may encompass further parameters $p_i$ about further recognized properties of further vehicle 116. In the process, further parameters $p_i$ are ascertained and provided by recognition component 200 based on sensor data 106.

FIG. 3 shows a flow chart of a method 300 which may be carried out, for example, by evaluation unit 102 from FIGS. 1 and 2.

In the process, in a first step 310, sensor data 106 are received.

In a second step 320, an object recognition is carried out based on sensor data 106. In the process, further vehicle 116 is recognized. More precisely, at least one movement parameter $p_1$, $p_2$ and/or at least one further object parameter $p_3$ with respect to further vehicle 116 is/are estimated. The estimation may take place continuously in multiple consecutive time steps. In other words, parameters $p_1$, $p_2$, $p_3$ may be continuously updated based on sensor data 106.

In a third step 330, parameters $p_1$, $p_2$, $p_3$ are combined into object transfer priority p.

In a fourth step 340, object transfer priority p is evaluated to decide whether object message 118 with respect to further vehicle 116 is to be generated or not.

If object transfer priority p is sufficiently high, object message 118 is generated in a fifth step 350 and sent via the communication network to other road users, for example to further vehicles 116 and 120.

Different exemplary embodiments are described again hereafter in other words.

Evaluation unit 102 may, for example, be configured to calculate a surroundings model of vehicle 100. A list of objects which are detected by sensor system 104 may be stored in the surroundings model. Each recognized object has an assigned object transfer priority p. Every time a new object message is generated, multiple priority values $p_i$ are calculated for each recognized object and combined with one another into object transfer priority p. In other words, object transfer priority p is not stored in the surroundings model, but calculated based on object data in the surroundings model. Individual priority values $p_i$ may, for example, be based on the following criteria or questions.

1. How exact and reliable is the object recognition?

For this purpose, a measuring certainty with respect to the recognized object, here further vehicle 116, is calculated. Measurements having a high measuring certainty, i.e., having a high confidence, are to be transferred with a higher priority:

$p_4$=measuring certainty

2. To what degree are object data in the surroundings model enhanced by sensor data 106?

This may be measured or estimated using various complementary methods. For example, the increase in the trustworthiness of the recognized object, also referred to as object confidence, may be calculated via an existence probability or covariance after a measurement has been integrated into the surroundings model. If the recognized object was not yet present in the surroundings model, the confidence may be set to zero before the measurement is integrated into the surroundings model. Measurements which considerably increase the object confidence should be transferred with a higher priority:

$p_5$=deviation

A deviation shall be understood to mean a deviation between the object confidence after the measurement has been integrated into the surroundings model and the object confidence before the measurement has been integrated into the surroundings model. The deviation may, for example, be expressed by a subtraction or a quotient.

It is also possible to detect dynamic properties of an object, such as absolute values of its velocity or acceleration. Objects having higher dynamics should be transferred with an accordingly higher priority:

$p_1$=|velocity of the object|

$p_2$=|acceleration of the object|

In addition, a change in the dynamic properties of the object may be detected after the measurement has been integrated into the surroundings model. Measurements by which the dynamic properties of the object are changed considerably should be transferred with a higher priority:

$p_6$=deviation (deviation between an object position after the measurement has been integrated into the surroundings model and an object position before the measurement has been integrated into the surroundings model)

$p_7$=deviation (deviation between an object velocity after the measurement has been integrated into the surroundings model and an object velocity before the measurement has been integrated into the surroundings model)

$p_8$=deviation (deviation between an object acceleration after the measurement has been integrated into the surroundings model and an object acceleration before the measurement has been integrated into the surroundings model)

In the process, a distinction may optionally be made between a position change transverse to the traffic flow and a position change longitudinal to the traffic flow, the latter having a lower relevance than the first.

3. How likely is a collision of recognized object 116 with a neighboring vehicle?

For this purpose, a presumable trajectory of recognized object 116 and of all vehicles in the surroundings model is ascertained. Based on the presumable trajectories, a time until a potential collision with the recognized object is calculated for each vehicle, also referred to as time to collision (TTC). Recognized objects having a shorter time until the collision should be transferred with a higher priority to other vehicles:

$p_9$=min TTC (between a recognized object and all vehicles in the surroundings model)

4. What object type may recognized object 116 be assigned to?

Recognized object 116 may be classified based on various object classes, such as, for example, pedestrian, bicyclist, passenger car, or truck. Road users particularly at risk, such as pedestrians or bicyclists, should have a higher priority since the collision risk is more difficult to estimate for them due to uncertainties in the prediction of their trajectory, and they, due to their smaller size, are potentially more difficult to recognize by other vehicles:

$p_3$=f(object class)

5. How much concealment does recognized object 116 cause?

Recognized object 116 may partially or entirely conceal other objects so that they are no longer detectable by vehicle 100. For example, a parked truck may prevent the recognition of vehicles or pedestrians situated behind it, or make it more difficult. The relevant area concealed by recognized object 116 may be estimated by the surroundings model. Recognized objects which generate a high level of concealment should be transferred with a higher priority:

$p_{10}$=relevant area concealed by the recognized object

6. When was an object message 118 including pieces of information about recognized object 116 sent last?

If some time has elapsed since an object message with respect to recognized object 116 has been sent, it is possible that data in this regard of neighboring vehicles are no longer up-to-date. Accordingly, recognized object 116 should be assigned a higher priority. If an object message 118 with respect to recognized object 116 is sent for the first time, the priority is initially set to a default value, for example.

$p_{11}$=time since an object message 118 with respect to recognized object 116 was sent last 7. When was an object message including pieces of information about recognized object 116 received last?

If some time has elapsed since an object message with respect to recognized object 116 has been received, it is possible that neighboring vehicles are not able to recognize the object with the aid of their on-board sensors. Accordingly, recognized object 116 should be assigned a higher priority. If no object message with respect to recognized object 116 has been received yet, the priority is initially set to a default value, for example.

$p_{12}$=time since an object message with respect to recognized object 116 was received last As soon as all priority values $p_i$ have been calculated, priority values $p_i$ are combined into object transfer priority p, using a suitable function of $p_i$. Such a function may be, for example, a weighted sum $p=\Sigma p_i \cdot w_i$, a weighted product $p=\Pi p_i^{w_i}$, or a combination thereof, $w_i$ representing weights by which priority values $p_i$ are rendered comparable to one another, taking their differing importance into consideration.

The list of recognized objects including the object transfer priorities may be sent periodically to a transfer protocol, for example. The transfer protocol may select based on object transmission priorities p which of the recognized objects are to be transferred. When the number of selected objects is greater than zero, an object message 118 is generated. Otherwise, for example, no object message 118 is generated.

It shall be pointed out that terms such as "including," "having," etc. do not exclude other elements or steps, and that terms such as "a" or "an" do not exclude a plurality. Reference numerals shall not be regarded as limiting.

What is claimed is:

1. A method comprising the following steps being performed during a drive of a first vehicle and an automated drive of a second vehicle:
   receiving, by a processor of the first vehicle, sensor data generated by a sensor system of the first vehicle;
   recognizing, by the processor of the first vehicle, a plurality of objects in surroundings of the first vehicle based on the sensor data;
   for each of the recognized plurality of objects:
      ascertaining, by the processor of the first vehicle and based on respective parts of the sensor data corresponding to the respective object, respective values for each of a plurality of object characteristics;
      differently weighting, by the processor of the first vehicle, the ascertained respective values to obtain a single respective overall object transfer priority of the respective object, wherein the weighting is performed by, for each of one or more of the ascertained respective values, performing a mathematical operation on the respective value with a respective weighting factor, to thereby obtain a modified set of characteristic values, the modified set of characteristic values being combined to form the single respective overall object transfer priority; and
      comparing, by the processor of the first vehicle, the obtained single respective overall object transfer priority of the respective object to a single predefined threshold value to determine whether the obtained single respective overall object transfer priority is greater than the single predefined threshold value; and
   transmitting, via a communication network, to a processor of the second vehicle at least one message generated by the processor of the first vehicle based on results of the comparisons according to a condition that information about all and only those of the objects whose single respective overall object transfer priority has been determined in the comparison to be greater than the single predefined threshold is included in the at least one message, wherein as a result of the condition, for each respective one of the plurality of objects whose obtained single respective overall object transfer priority is not greater than the single predefined threshold value, information about the respective one of the plurality of objects is not transmitted to the processor of the second vehicle.

2. The method as recited in claim 1, wherein:
   one of the characteristics indicates a transverse movement and a longitudinal movement of the recognized object relative to a driving direction of the first vehicle.

3. The method as recited in claim 1, further comprising:
   inserting the recognized object into a surroundings model representing the surroundings of the first vehicle, the surroundings model storing the respective values for the each of the plurality of object characteristics;
   updating the stored respective values in the surroundings model in consecutive time steps based on the sensor data;
   ascertaining a change in the stored respective values between at least two time steps; and
   using the ascertained change for the obtainment of the single respective overall object transfer priority.

4. The method as recited in claim 1, wherein, for each of at least one respective one of the plurality of objects, a measuring certainty with respect to the respective object is ascertained and used for the obtainment of the single respective overall object transfer priority of the respective object.

5. The method as recited in claim 1, further comprising:
   ascertaining, for a respective one of the objects, a plurality of time periods until a respective potential collision with the respective recognized object based on the sensor data; and
   ascertaining a shortest time period of the ascertained plurality of time periods;
   wherein, based on the ascertainment of the shortest time period, the ascertained shortest time period is used for the obtainment of the single respective overall object transfer priority of the respective object.

6. The method as recited in claim 1, further comprising:
   ascertaining, for a respective one of the objects, a degree of concealment caused by the respective object;
   wherein, based on the ascertainment of the degree of concealment, the ascertained degree of concealment is used for the obtainment of the single respective overall object transfer priority of the respective object.

7. The method as recited in claim 1, wherein each of the objects is assigned to at least one of a plurality of object classes, each of the plurality of object classes is assigned a respective priority value, and, for each of the objects, the respective at least one object class that is assigned to the respective object is used for the obtainment of the single respective overall object transfer priority of the respective object.

8. The method as recited in claim 1, further comprising:
   for each of the objects, ascertaining a transfer time period since the last time an earlier instance of the at least one message that includes an indication about the respective object was sent and/or received via the communication network;
   wherein, based on the ascertainment of the transfer time period, the transfer time period is used for the obtainment of the single respective overall object transfer priority of the respective object.

9. A system of a first vehicle, the system comprising:
   a sensor system;
   an interface to a communication network; and
   a processor, wherein, during a drive of the first vehicle and an automated drive of a second vehicle, the processor of the first vehicle is configured to:
      receive sensor data generated by the sensor system of the first vehicle;
      recognize a plurality of objects in surroundings of the first vehicle based on the sensor data;

for each of the recognized plurality of objects:
ascertain, based on respective parts of the sensor data corresponding to the respective object, respective values for each of a plurality of object characteristics;
differently weight the ascertained respective values to obtain a single respective overall object transfer priority of the respective object, wherein the weighting is performed by, for each of one or more of the ascertained respective values, performing a mathematical operation on the respective value with a respective weighting factor, to thereby obtain a modified set of characteristic values, the modified set of characteristic values being combined to form the single respective overall object transfer priority; and
compare the obtained single respective overall object transfer priority of the respective object to a single predefined threshold value to determine whether the obtained single respective overall object transfer priority is greater than the single predefined threshold value; and
transmit, via a communication network, to a processor of the second vehicle at least one message generated by the processor of the first vehicle based on results of the comparisons according to a condition that information about all and only those of the objects whose single respective overall object transfer priority has been determined in the comparison to be greater than the single predefined threshold is included in the at least one message, wherein as a result of the condition, for each respective one of the plurality of objects whose obtained single respective overall object transfer priority is not greater than the single predefined threshold value, information about the respective one of the plurality of objects is not transmitted to the processor of the second vehicle.

10. A non-transitory computer-readable medium on which is stored a computer program that is executable by a processor of a first vehicle and that, when executed by a processor, causes the processor to perform the following steps during a drive of the first vehicle and an automated drive of a second vehicle:
receiving sensor data generated by a sensor system of the first vehicle;
recognizing a plurality of objects in surroundings of the first vehicle based on the sensor data;
for each of the recognized plurality of objects:
ascertaining, based on respective parts of the sensor data corresponding to the respective object, respective values for each of a plurality of object characteristics;
differently weighting the ascertained respective values to obtain a single respective overall object transfer priority of the respective object, wherein the weighting is performed by, for each of one or more of the ascertained respective values, performing a mathematical operation on the respective value with a respective weighting factor, to thereby obtain a modified set of characteristic values, the modified set of characteristic values being combined to form the single respective overall object transfer priority; and
comparing the obtained single respective overall object transfer priority of the respective object to a single predefined threshold value to determine whether the obtained single respective overall object transfer priority is greater than the single predefined threshold value; and
transmitting, via a communication network, to a processor of the second vehicle at least one message generated by the processor of the first vehicle based on results of the comparisons according to a condition that information about all and only those of the objects whose single respective overall object transfer priority has been determined in the comparison to be greater than the single predefined threshold is included in the at least one message, wherein as a result of the condition, for each respective one of the plurality of objects whose obtained single respective overall object transfer priority is not greater than the single predefined threshold value, information about the respective one of the plurality of objects is not transmitted to the processor of the second vehicle.

11. The method as recited in claim 2, wherein the single respective overall object transfer priority is obtained in a manner by which the lateral movement contributes more than the longitudinal movement to an increase of the single respective overall object transfer priority.

12. The method as recited in claim 1, further comprising:
generating a surroundings model of an environment of the first vehicle; and
for each of at least one respective one of the plurality of objects, determining a difference in the surroundings model caused by an incorporation of the information about the respective object into the surroundings model, wherein the overall object transfer priority of the respective object depends on the determined difference.

13. The method as recited in claim 1, wherein the processor of the second vehicle is configured to perform a control of the second vehicle for the automated drive of the second vehicle in response to the information of the at least one message, the control including a steering control, a braking control, an acceleration control, an engine control, and/or a navigation control according to a digital map.

14. The method as recited in claim 1, wherein the weighting is performed by a potentiation of the respective value by the respective weighting factor.

15. The method as recited in claim 1, wherein the weighting is performed by a multiplication of the respective value by the respective weighting factor.

* * * * *